(12) United States Patent
Fujiwara et al.

(10) Patent No.: US 8,999,470 B2
(45) Date of Patent: Apr. 7, 2015

(54) SURFACE CONDUCTIVE LAMINATED SHEET AND ELECTRONIC PART PACKAGING CONTAINER

(75) Inventors: Junpei Fujiwara, Isesaki (JP);
Masatoshi Kawata, Isesaki (JP);
Yasushi Miyamura, Isesaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 180 days.

(21) Appl. No.: 13/636,906

(22) PCT Filed: Mar. 18, 2011

(86) PCT No.: PCT/JP2011/056552
§ 371 (c)(1),
(2), (4) Date: Sep. 24, 2012

(87) PCT Pub. No.: WO2011/118522
PCT Pub. Date: Sep. 29, 2011

(65) Prior Publication Data
US 2013/0017350 A1 Jan. 17, 2013

(30) Foreign Application Priority Data
Mar. 24, 2010 (JP) ................. 2010-067277

(51) Int. Cl.
*B29D 22/00* (2006.01)
*B29D 23/00* (2006.01)
(Continued)

(52) U.S. Cl.
CPC ............ *B32B 27/30* (2013.01); *B32B 25/14* (2013.01); *B32B 27/20* (2013.01); *B32B 27/302* (2013.01);
(Continued)

(58) Field of Classification Search
CPC ........ B32B 25/14; B32B 27/20; B32B 27/30; B32B 27/302; B32B 2307/202; B32B 2264/108
USPC ....................................... 428/36.8
See application file for complete search history.

(56) References Cited

U.S. PATENT DOCUMENTS 5,041,498 A * 8/1991 Hare et al. ............... 525/71
5,225,494 A * 7/1993 Ishiga ..................... 525/316
(Continued)

FOREIGN PATENT DOCUMENTS

CN 1646625 A 7/2005
JP 4 136060 5/1992
(Continued)

OTHER PUBLICATIONS
Adams, M.E., Buckley, D.J., Colborn, R.E., "Acrylonitrile-Butadiene-Styrene," iSmithers Rapra Publishing, Jan. 1, 1993.*
(Continued)

*Primary Examiner* — Michael C Miggins
(74) *Attorney, Agent, or Firm* — Oblon, McClelland, Maier & Neustadt, L.L.P.

(57) ABSTRACT

Disclosed is a surface conductive laminated sheet which comprises a base material layer containing an ABS resin as a main component, and a surface layer laminated on the surface of at least one side of the base material layer. In the laminated sheet, the ABS resin in the base material layer includes a composition made of 5-15 mass % of vinyl cyanide monomer, 45-65 mass % of diene-based rubber, and 50-20 mass % of aromatic vinyl monomer, and includes a graft rubber having a graft rate of 50-80%. The graft rubber has a mass average molecular weight (Mw) of a graft chain of 18,000-56,000, and/or has a volume average particle diameter of 0.3 to 2.0 μm. By using the laminated sheet, it is possible to obtain an electronic part packaging container, such as carrier tape etc., which has extremely few punch burrs regardless of the type of forming apparatus when punched by means of a slit method or embossing.

14 Claims, 1 Drawing Sheet

(51) Int. Cl.
   *B32B 1/08*      (2006.01)
   *B65D 39/00*     (2006.01)
   *B32B 27/30*     (2006.01)
   *B32B 25/14*     (2006.01)
   *B32B 27/20*     (2006.01)
   *C08L 25/12*     (2006.01)
   *C08L 51/04*     (2006.01)

(52) U.S. Cl.
   CPC ............... *C08L 25/12* (2013.01); *C08L 51/04* (2013.01); *B32B 2264/108* (2013.01); *B32B 2270/00* (2013.01); *B32B 2307/202* (2013.01); *B32B 2439/00* (2013.01); *B65D 2585/86* (2013.01)

(56) References Cited

U.S. PATENT DOCUMENTS 5,747,164 A * 5/1998 Miyakawa et al. ........ 428/411.1
6,774,182 B2 * 8/2004 Yoo et al. ........................ 525/70

FOREIGN PATENT DOCUMENTS

| | | |
|---|---|---|
| JP | 5 255557 | 10/1993 |
| JP | 9 76422 | 3/1997 |
| JP | 9 76425 | 3/1997 |
| JP | 9 174769 | 7/1997 |
| JP | 10 7857 | 1/1998 |
| JP | 10 110073 | 4/1998 |
| JP | 2000 17137 | 1/2000 |
| JP | 2003 170547 | 6/2003 |
| TW | 200616791 | 6/2006 |
| WO | 2006 030871 | 3/2006 |
| WO | WO 2006/028064 A1 | 3/2006 |
| WO | WO 2008/020579 A1 | 2/2008 |

OTHER PUBLICATIONS

International Search Report Issued May 24, 2011 in PCT/JP11/056552 Filed Mar. 18, 2011.
Combined Office Action and Search Report issued Mar. 3, 2014 in Chinese Patent Application No. 201180015194.7 (with English translation of category of Cited Documents).

* cited by examiner

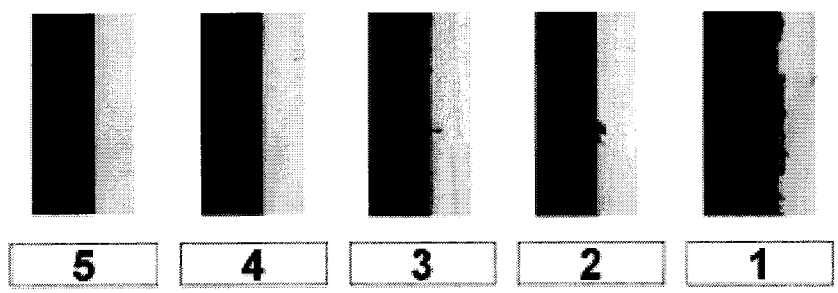

SURFACE CONDUCTIVE LAMINATED SHEET AND ELECTRONIC PART PACKAGING CONTAINER

TECHNICAL FIELD

The present invention relates to a surface conductive laminated sheet formed from a thermoplastic resin, and a container for packaging electronic parts, such as a carrier tape or a tray for transporting electronic parts, using the laminated sheet.

BACKGROUND ART

Vacuum-molded trays and embossed carrier tapes obtained by heat molding sheets have been used as containers for packaging intermediates of all kinds of industrial products such as electronic devices or automobiles. Additionally, sheets with a substrate layer formed from a polystyrene resin or an ABS resin laminated with a polystyrene resin comprising a conductive filler such as carbon black have been used for containers for packaging IC's, which dislike static, or various parts having IC's (for example, see Patent Documents 1 to 3). In particular, surface conductive sheets using an ABS resin as the substrate layer are often used due to their excellent mechanical properties. However, in recent years, as electronic parts such as IC's become smaller, the occurrence of fluff or burrs on the cut surfaces when slitting raw sheets into tape widths or when punching sprocket holes during emboss molding has come forth as a major problem to be solved, and the lack of occurrence of fluff and punching burrs has become a property required of carrier tapes etc.

In order to solve the problem, for example, the inclusion of a polyolefin or a block copolymer, such as SBS or SEBS, in a substrate layer or a surface conductive layer has been proposed (see Patent Documents 4 and 5).

However, while there were cases where the above remedial measures reduced fluff or punching burrs caused by slitting or punching of sprocket holes, depending on the slitting method or the molding machine used for emboss molding, there were cases where there was almost no recognizable improvement.

RELATED ART DOCUMENTS

Patent Documents

Patent Document 1: JP-A H9-76422
Patent Document 2: JP-A H9-76425
Patent Document 3: JP-A H9-174769
Patent Document 4: WO 2006/030871
Patent Document 5: JP-A 2003-170547

SUMMARY OF THE INVENTION

The present invention was achieved in view of the above circumstances, and the object is to provide a surface conductive laminated sheet which uses an ABS resin as a substrate layer and has very little punching burr occurrence caused by slitting methods or punching during emboss molding, no matter what type of molding machine is used.

Additionally, the object of the present invention is to provide a container for packaging electronic parts, such as a carrier tape or a tray for transporting electronic parts, using the above surface conductive laminated sheet.

The present inventors, as a result of diligent investigations of the problems, found that by using a specific resin composition to constitute each layer in a multi-layered laminated sheet wherein an acrylonitrile-butadiene-styrene copolymer is used as a substrate, and in particular, by using a resin having a specific grafted rubber as the resin constituting the substrate layer, a sheet that solves all of the above problems can be obtained, thereby arriving at the present invention.

As such, one aspect of the present invention provides a surface conductive laminated sheet having a substrate layer with an ABS resin as a main ingredient and a surface layer laminated on at least one surface of the substrate layer, wherein the ABS resin in the substrate layer comprises a composition of 5 to 15 mass % of a vinyl cyanide monomer, 45% to 65 mass % of a diene rubber and 50 to 20 mass % of an aromatic vinyl monomer, and a grafted rubber having a graft ratio of 50% to 80%; the grafted rubber having a graft chain with a mass average molecular weight (Mw) of 18,000 to 56,000 and/or a volume average particle diameter of 0.3 μm to 2.0 μm.

In one embodiment, the grafted rubber in the ABS resin has a graft chain with a mass average molecular weight (Mw) of 18,000 to 56,000 and a volume average particle diameter of 0.3 μm to 2.0 μm.

In another embodiment, the ABS resin, in addition to the above grafted rubber, further comprises a copolymer of vinyl cyanide and an aromatic vinyl (an AS copolymer). For example, in one embodiment, the ABS resin is a resin comprising 15 to 50 mass % of a grafted rubber and 85 to 50 mass % of a copolymer of vinyl cyanide and an aromatic vinyl.

In yet another embodiment, the copolymer of vinyl cyanide and an aromatic vinyl has a composition of 20 to 40 mass % of vinyl cyanide and 60 to 80 mass % of the aromatic vinyl and a mass average molecular weight (Mw) of 80,000 to 120,000.

While the surface layer may be formed from any material as long as it is a layer which exhibits a desired surface resistance, in one embodiment, it is constituted by a thermoplastic resin composition having a surface resistance of $10^2$ to $10^{10} \Omega$, and in another embodiment, it is constituted by a resin composition comprising a styrene resin and carbon black.

Another aspect of the present invention provides a container for packaging electronic parts, such as a carrier tape or a tray for transporting electronic parts, molded from the above surface conductive laminated sheet.

According to the present invention, since a specific ABS resin and/or ABS resin composition, in particular, an ABS resin having a specific grafted rubber, is used as the substrate layer, it is possible to obtain a surface conductive laminated sheet which has very few punching burrs caused by slitting methods or by punching during emboss molding, no matter what type of molding machine is used, as well as a container for packaging electronic parts such as a carrier tape using the sheet.

BRIEF DESCRIPTION OF THE DRAWINGS

FIG. 1 is an evaluation sample of punching burr states when punching sheets of examples and comparative examples.

MODES FOR CARRYING OUT THE INVENTION

The surface conductive laminated sheet according to one embodiment of the present invention is constituted by a substrate layer with an ABS resin as a main ingredient and a surface layer having conductivity laminated on at least one surface of the substrate layer.

Here, an ABS resin refers to a resin or a resin composition comprising a diene rubber-aromatic vinyl monomer-vinyl cyanide monomer terpolymer, typically a resin or a resin composition comprising an acrylonitrile-butadiene-styrene terpolymer, and preferably, in addition to the terpolymer, further comprising a copolymer of vinyl cyanide and an aromatic vinyl, typically an acrylonitrile-sytrene bipolymer (AS copolymer).

In other words, the ABS resin is a resin composition comprising a diene rubber-vinyl aromatic monomer-vinyl cyanide monomer terpolymer, typically an acrylonitrile-butadiene-styrene terpolymer, and a copolymer of vinyl cyanide and an aromatic vinyl, typically an AS copolymer, i.e. an acrylonitrile-styrene bipolymer, in a mixed state, formed from a dispersed phase comprising a grafted rubber which is an acrylonitrile-butadiene-styrene terpolymer formed by graft polymerizing styrene and acrylonitrile to a polybutadiene rubber, a styrene-butadiene rubber (SBR) or a styrene-butadiene block copolymer, or a hydrogenated product thereof and a continuous phase comprising an acrylonitrile and styrene bipolymer (AS copolymer). The grafted rubber here refers to one that can be separated from the ABS resin by the method described below.

Each of the above polymers may contain, in addition to its monomer units, another type of monomer within a range that does not compromise the effect of the present invention; for example, as a trace constituent of styrene monomers, a monomer such as a-methyl styrene, vinyl toluene, dimethylstyrene, chlorostyrene, or vinylnaphthalene may be included, and as a trace constituent of vinyl cyanide monomers, a monomer such as methacrylonitrile, ethacrylonitrile or fumaronitrile may be included.

As described above, the ABS resin comprises a dispersed phase of a grafted rubber comprising an acrylonitrile-butadiene-styrene terpolymer and a continuous phase of an AS copolymer, and the proportions at which these phases are contained are generally within ranges of 15 to 50 mass % of the grafted rubber and 85 to 50 mass % of the AS copolymer.

As the above grafted rubber, if the grafted rubber is 100 mass %, preferably one with the following component contents as measured by the method described below is used: 5 to 15 mass % of acrylonitrile (AN), 45 to 65 mass % of butadiene (Bd) and 50 to 20 mass % of styrene (St).

When the component contents are within the above ranges, there is a good balance among various mechanical properties, and good sheet punching properties as evaluated by the method described below can be obtained. When the Bd content is less than the range, the impact strength (DuPont impact strength), folding endurance and breaking elongation of the resulting laminated sheet are low, and sufficient mechanical properties cannot be obtained. Moreover, when the Bd content is greater than the range, strength properties such as yield strength are reduced. Additionally, in either case, burr occurrence when punching the resulting sheet becomes greater.

Additionally, it is important in the present invention that the graft ratio of the grafted rubber be 50 to 80%, and more preferably 50 to 75%. Graft ratio, the measurement method of which shall be described in detail below, is basically the mass ratio of a graft chain comprising AN and St that is grafted to the rubber content in a grafted rubber. When the graft ratio is less than 50%, burrs occur frequently, and when the graft ratio exceeds 80%, the sheet strength is reduced. Strictly speaking, the method for adjusting the graft ratio of the grafted rubber changes with the manufacturing methods of the ABS resins, but it can be adjusted by adjusting general polymerization conditions such as the amount of polymerization initiator added, the amount of chain transfer agent added, the time of addition and temperature control during polymerization. Additionally, ABS resins containing a grafted rubber within this range of graft ratio are available commercially.

Furthermore, the mass average molecular weight (Mw) of the graft chain of the above grafted rubber is preferably 18,000 to 56,000. When Mw is less than 18,000, the DuPont impact strength and folding endurance of the resulting laminated sheet may be reduced, and when it exceeds 56,000, burr occurrence may increase when punching a laminated sheet of the present invention as described below. This demonstrates that an increased interaction between a graft branch of a grafted rubber and an AS copolymer is one of the causes for burr occurrence when punching sheets.

In addition, the volume average particle diameter of the above grafted rubber is preferably 0.3 μm to 2.0 μm. When the volume average particle diameter is less than 0.3 μm, the DuPont impact strength and folding endurance of the resulting laminated sheet may be reduced, and when the volume average particle diameter exceeds 2.0 μm, burr occurrence could increase.

On the other hand, as the above AS copolymer constituting the continuous phase, when considering extrusion moldability, a copolymer of 20 to 40 mass % of acrylonitrile (AN) and 80 to 60 mass % of styrene (St) is preferably used.

Moreover, the AS copolymer preferably has an Mw of 80,000 to 120,000. When the Mw is less than 80,000, the DuPont impact strength and folding endurance of the resulting laminated sheet may be reduced, and when it exceeds 120,000, burr occurrence could increase.

Other than the above resin component, carbon black such as acetylene black, furnace black or channel black may be added to the substrate layer of the present invention within a range that does not compromise the fluidity during melt extrusion. Particularly, in cases where acetylene black is added, an addition within a range of 0.1 to 10 parts by mass to 100 parts by mass of the resin component can solve the problem of a molded article being transparent at corners due to the thickness of the sheet becoming thin when molded into a container for packaging.

The laminated sheet of the present invention has a conductive surface layer on at least one side of a substrate layer as described above. The surface resistance of the surface layer is preferably $10^2$ to $10^{10}\Omega$. When the surface resistance is greater than this range, it is difficult to suppress static-induced damages of electronic parts, and when the surface resistance is lower than this range, electricity such as static can easily flow in from outside, which may damage electronic parts.

While the surface layer may be formed by any material so long as the material achieves the above surface resistance, usually, for example, a layer coated by a conductive coating or a thermoplastic resin, such as a polystyrene resin or an ABS resin, kneaded with a conductive filler is used, among which a conductive layer containing a polystyrene resin and carbon black is preferred when considering moldability etc. Here, the polystyrene resin refers to a styrene homopolymer or copolymer, for example, a general purpose polystyrene or an high impact polystyrene containing a conjugated diene polymer component or a blend thereof. Moreover, various additives such as lubricants, plasticizers and processing aids or inorganic fillers may be added to the conductive layer.

The carbon black used in the surface layer is furnace black, channel black, acetylene black or the like, and preferably has a large specific surface area, and acetylene black is particularly preferred as the addition of a small amount to a resin results in high conductivity. The amount added is preferably 5 to 50 parts by mass with respect to a total of 100 parts by mass of the polystyrene resin. When it is less than 5 parts by mass, it is not possible to obtain enough surface resistance to prevent static-induced damage of electronic parts, and when it exceeds 50 parts by mass, the fluidity is reduced and the mechanical strength of the resulting sheet is also reduced.

The method for producing the laminated sheet of the present invention is not particularly limited, and a common method well known to those skilled in the art may be used to produce the sheet. For example, it may be suitably produced by providing the raw materials respectively constituting the substrate layer and surface layer to separate extruders and extrusion molding using a multilayer T-die having a multi-manifold or T-die extrusion molding using a feed block. Moreover, in these types of methods for producing laminated sheets, it is common to pulverize the so-called "deckle edge" portion that occurs during sheet extrusion and return it to the substrate layer, and it can be returned within a range that does not greatly affect the DuPont impact strength, folding resistance or burrs of the laminated sheet.

Additionally, in another embodiment of the present invention, a container for packaging electronic parts molded using the above conductive laminated sheet is provided. In other words, by molding a conductive laminated sheet using a well known sheet molding method (heat molding method) such as vacuum molding, pressure forming or press forming, containers for packaging electronic parts of various shapes such as carrier tapes (embossed carrier tapes) and trays for transporting electronic parts can be obtained, but by using a conductive laminated sheet of the above constitution as the conductive laminated sheet, it is possible to obtain a packaging container with very little fluff or burr occurrence at its cut surfaces when slitting the laminated sheet or when punching sprocket holes or the like during molding of the container for packaging electronic parts. Particularly, in addition to the very little burr occurrence when emboss molding into a carrier tape, an embossed carrier tape which is excellent in both folding endurance and impact strength can be obtained.

Here, the embossed carrier tape is used in the storage and transport of electronic parts as a carrier tape body covered by a cover tape and rolled in the form of a reel. A carrier tape body is one with electronic parts stored in the carrier tape. The electronic parts to be packaged are not particularly limited and may be, for example, IC's, LED's (light emitting diodes), resistors, liquid crystals, capacitors, transistors, piezoelectric resistors, filters, crystal oscillators, crystal resonators, diodes, connectors, switches, variable resistors, relays or inductors. Moreover, it may also be used to package intermediates or final products using these electronic parts.

EXAMPLES

Herebelow, examples shall be used to explain the present invention in detail.

[Method for Evaluating Resin Properties]

The properties defining the ABS resins used in the examples and comparative examples below were evaluated by the following methods.

(1) Measurement of Contents of Grafted Rubber and as Copolymer in ABS Resins

After placing approximately 1.2 g of an ABS resin in a 100 ml Erlenmeyer flask and adding 30 g of methyl ethyl ketone (MEK), it was mixed for 24 hours at a temperature of 23° C., then separation of MEK insoluble fraction was carried out using a centrifuge (CR26H manufactured by Hitachi, Ltd.), and was left to stand for 30 minutes after centrifugation. The operation conditions of the centrifuge were set as follows.

Temperature: −9° C.
Number of Revolution: 23,000 rpm
Time: 50 minutes

The supernatant and sediment of the centrifuged solution were separated, the supernatant was poured into a 300 ml beaker containing 150 ml of methanol to precipitate, and the precipitates were suction filtered using filter paper. The residues were dried at room temperature for 24 hours, followed by 4 hours in a vacuum dryer to remove the remaining solvent, to obtain a sample.

MEK was further added to the obtained sediment of the MEK insoluble fraction, washing was carried out by centrifugation, the product after suction filtration and vacuum drying was the "grafted rubber", the sediment obtained by methanol precipitation of the above MEK soluble fraction was the "AS copolymer", and their contents were respectively calculated based on their mass ratios.

Additionally, regarding the ABS resin in which an AS copolymer was further added to the above ABS resin, the contents of the grafted rubber and AS copolymer were calculated in accordance with the above method.

(2) Method for Measuring Graft Ratios of Grafted Rubbers

Regarding grafted rubbers obtained in the same manner as the above (1), the amounts of AN monomers (y) were quantified by Kjeldahl nitrogen analysis, the amounts of St monomers (z) were quantified by pyrolysis gas chromatography, and the graft ratios were calculated by the following equation.

$$\text{Graft ratio }(\%) = 100 \times (y+z) / \{(x-(y+z))\}$$

wherein x is the total mass of the grafted rubber (3) Method for Measuring Mass Average Molecular Weights (Mw) of Graft Chains in Grafted Rubbers A method for ozonolyzing grafted rubbers and subsequently reducing them by lithium aluminum hydride was performed in accordance with the methods described in *Polymer*, vol. 22, 1721 (1981), *Rubber Chemistry and Technology*, vol. 59, 16 (1986), and *Macromolecules*, vol. 16, 1925 (1983) etc.

That is, approximately 0.15 g of grafted rubber was precisely weighed and dispersed in 50 ml of dichloromethane. The solution was placed in a 100 ml three-necked flask and cooled to a state −80° C., and in this state, ozone-containing oxygen provided by an ozone generator (LABO OZON-250 manufactured by Asahi Techniglass Co., Ltd.) was infused into the three-necked flask at a flow rate of 100 ml/min to carry out ozone oxidation. The air current flowing from the three-necked flask was passed through an aqueous potassium iodide solution, and the ozone oxidation reaction was continued until the solution turned yellow.

Subsequently, 0.35 g of lithium aluminum hydride and 50 ml of diethyl ether were placed in a separately prepared 300 ml three-necked flask and mixed, and the ozone oxidation reaction solution was dripped into this three-necked flask at room temperature. After the delivery, the 300 ml three-necked flask was heated in a 60° C. oil bath to allow reflux in the system for 45 minutes.

Afterwards, the 300 ml three-necked flask was cooled to room temperature, 2.5 g of water was dripped into the reaction solution, and unreacted lithium aluminum hydride was degraded. Furthermore, after adding an appropriate amount of magnesium sulfate, the reaction solution was suction filtered, the solvent in the resulting filtrate was distilled away to obtain a polymer fraction, which was vacuum dried. In the present invention, the obtained polymer fraction was made the graft chain, and mass average molecular weight (Mw) was measured as a polystyrene equivalent by GPC.

(4) Method for Measuring Volume Average Particle Diameters of Grafted Rubbers

The volume average particle diameter of a grafted rubber was obtained by laser diffraction and scattering using a solution of the grafted rubber latex diluted with distilled water as a sample. The measurement conditions are as follows.

Device: Coulter LS 230 (manufactured by Coulter Corporation)
Concentration: 2.0%
Diluent solvent: distilled water (5) Measurement of Mass Average Molecular Weights (Mw) of as Copolymers Mass average molecular weights (Mw) were obtained by GPC curves of MEK soluble fractions of grafted rubbers obtained by the above method (1).

[Method for Evaluating Sheets]

The laminated sheets of the examples/comparative examples were each evaluated for the following properties by the following evaluation methods.

(1) Tensile Properties

In accordance with JIS-K-7127, test pieces sampled in the MD (direction of sheet extrusion) and TD (direction perpendicular to the direction of sheet extrusion) of each sheet were each evaluated using dumbbell No. 4 (breaking elongation, yield point strength, breaking point strength and tensile elasticity).

(2) Dupont Impact Strength

Using a DuPont impact tester, manufactured by Toyo Seiki Seisaku-Sho, Ltd., a 300 g load was dropped to obtain a 50% failure height, and an energy value was calculated from the load at that time. The calculation was performed in accordance with JIS-K-7211.

(3) Folding Endurance

Based on ASTM D2176, a 120 mm long, 15 mm wide and 0.3 mm thick test piece was produced, and an MIT folding endurance tester manufactured by Tokyo Seiki Seisaku-Sho, Ltd. was used, and the sheets were sampled with MD and TD as the length direction to perform MIT folding endurance measurements. At that time, tests were performed at a folding angle of 135 degrees, a folding speed of 175 rpm and a measuring load of 9.8 N.

(4) Tear Strength

In accordance with JIS-K-7128-3, test pieces with MD and TD as the length direction were measured for tear strength.

(5) Surface Resistance

A surface resistance tester manufactured by Mitsubishi Chemical Corporation (Loresta-EP) was used for the evaluation.

(6) Moldability

An embossed carrier tape was molded by a pressure forming machine manufactured by EDG. Those with good formability were rated 5 and those with poor formability were rated 1, to evaluate the moldability numerically on a 5-point scale.

(7) Punching Burr Index

Sheets were punched at 20 μm clearance (space between the punch pins and the platforms supporting the sheets) and a punch speed of 230 mm/sec, surfaces punched under these conditions were observed under a microscope at 30× magnification, and evaluations were carried out on a 5-point scale with a punch surface without burr occurrence as 5 and one with burr occurrence as 1, using the sample shown in FIG. 1 to evaluate burr size and incidence. At 4 or greater, problems such as contamination caused by burrs do not occur. Additionally, even when the punch speed was 230 mm/sec and clearance was changed to 2 and 60 μm, or when clearance was 20 μm and punch speed was changed to 130 mm/sec, similar evaluation was carried out for the sheet of each example.

Examples 1 to 14

As the raw material for the surface layers, 80 parts by mass of the following styrene resin and 20 parts by mass of acetylene black were mixed homogeneously by a high speed mixer. The resulting mixture was kneaded using a ϕ45 mm vent-type biaxial extruder and made into pellets by strand cutting.

Styrene resin: HIPS (H701N: manufactured by Denki Kagaku Kogyo)

Acetylene black: Denka Black (manufactured by Denki Kagaku Kogyo)

As the raw material resins for the separate substrate layers, resin compositions containing grafted rubbers having the compositions and properties of A to D shown in Table 1 and AS resins having the compositions of A and B shown in Table 2 in the proportions listed in Table 3 were used.

TABLE 1

|  |  | AN | St | Bd | Graft chain (Mw) | Graft ratio (%) | Volume average rubber particle diameter (μm) |
|---|---|---|---|---|---|---|---|
| Grafted rubber | A | 10 | 32 | 58 | 48,000 | 55 | 0.5 |
|  | B | 14 | 40 | 46 | 54,000 | 70 | 1 |
|  | C | 9 | 46 | 45 | 36,000 | 75 | 1.4 |
|  | D | 9 | 46 | 45 | 18,000 | 80 | 1.9 |
|  | E | 4 | 61 | 35 | 72,000 | 40 | 2.5 |
|  | F | 20 | 10 | 70 | 12,000 | 90 | 0.2 |
|  | G | 4 | 18 | 78 | 96,000 | 45 | 0.15 |

TABLE 2

|  |  | AN | St | Mw |
|---|---|---|---|---|
| AS copolymer | A | 29 | 71 | 110,000 |
|  | B | 25 | 75 | 85,000 |
|  | C | 29 | 71 | 60,000 |
|  | D | 29 | 71 | 140,000 |

TABLE 3

|  |  |  | Examples | | | | | |
|---|---|---|---|---|---|---|---|---|
|  |  |  | 1 | 2 | 3 | 4 | 5 | 6 |
| Grafted rubber | A | mass % | 34 |  | 34 |  | 25 |  |
|  | B | mass % |  | 34 |  | 34 |  | 50 |
| AS copolymer | A | mass % | 66 |  |  | 66 | 75 |  |
|  | B | mass % |  | 66 | 66 |  |  | 50 |

|  |  |  | Examples | | | | | |
|---|---|---|---|---|---|---|---|---|
|  |  |  | 7 | 8 | 9 | 10 | 11 | 12 |
| Grafted rubber | C | mass % | 34 |  | 34 |  | 25 |  |
|  | D | mass % |  | 25 |  | 25 |  | 50 |
| AS copolymer | A | mass % | 66 |  |  | 75 | 75 |  |
|  | B | mass % |  | 75 | 66 |  |  | 50 |

|  |  |  | Examples | |
|---|---|---|---|---|
|  |  |  | 13 | 14 |
| Grafted rubber | A | mass % | 20 |  |
|  | B | mass % |  | 20 |
| AS copolymer | A | mass % | 80 |  |
|  | B | mass % |  | 80 |

The resin compositions for the substrate layers and the above pellets for the surface layers were used, and two extruders, a ϕ65 mm extruder (L/D=28) and a ϕ40 mm extruder (L/D=26), a feed block and a T-die were used to mold three-layered sheets with two surface layers and a substrate layer in a ratio of 1:8:1 and a total thickness of 0.3 mm, samples were taken from each example and the above evaluation was performed. The evaluation results are summarized in Tables 4, 5 and 6.

TABLE 4

|  |  |  |  | Examples | | | | | |
| --- | --- | --- | --- | --- | --- | --- | --- | --- | --- |
|  |  |  |  | 1 | 2 | 3 | 4 | 5 | 6 |
| Tensile properties | Yield strength | MD | Mpa | 39 | 41 | 38 | 42 | 45 | 36 |
|  |  | TD |  | 37 | 40 | 36 | 41 | 42 | 35 |
|  | Breaking strength | MD | Mpa | 31 | 32 | 30 | 33 | 36 | 28 |
|  |  | TD |  | 31 | 33 | 30 | 32 | 35 | 28 |
|  | Elongation | MD | % | 91 | 85 | 98 | 81 | 60 | 100 |
|  |  | TD |  | 59 | 54 | 61 | 52 | 45 | 75 |
|  | Elasticity | MD | Mpa | 1580 | 1600 | 1510 | 1620 | 1860 | 1490 |
|  |  | TD |  | 1580 | 1610 | 1500 | 1610 | 1830 | 1480 |
| DuPont impact strength |  | J |  | 1.5 | 1.4 | 1.3 | 1.3 | 1.0 | 1.7 |
| Folding endurance |  | MD | times | 1000< | 1000< | 1000< | 1000< | 1000< | 1000< |
|  |  | TD |  | 1000< | 1000< | 1000< | 1000< | 700 | 1000< |
| Tear strength |  | MD | N | 140 | 140 | 130 | 140 | 170 | 130 |
|  |  | TD |  | 130 | 130 | 120 | 130 | 140 | 115 |
| Surface resistance |  | Ω |  | 2.8E+04 | 2.5E+04 | 2.8E+04 | 2.1E+04 | 2.6E+04 | 2.5E+04 |
| Moldability |  |  |  | 5 | 5 | 5 | 5 | 5 | 5 |

TABLE 5

|  |  |  |  | Examples | | | | | |
| --- | --- | --- | --- | --- | --- | --- | --- | --- | --- |
|  |  |  |  | 7 | 8 | 9 | 10 | 11 | 12 |
| Tensile properties | Yield strength | MD | Mpa | 42 | 46 | 45 | 47 | 46 | 37 |
|  |  | TD |  | 41 | 44 | 42 | 41 | 41 | 36 |
|  | Breaking strength | MD | Mpa | 33 | 39 | 36 | 41 | 40 | 29 |
|  |  | TD |  | 32 | 38 | 35 | 41 | 40 | 29 |
|  | Elongation | MD | % | 78 | 55 | 60 | 55 | 58 | 90 |
|  |  | TD |  | 50 | 45 | 45 | 48 | 45 | 65 |
|  | Elasticity | MD | Mpa | 1700 | 1850 | 1720 | 1890 | 1880 | 1580 |
|  |  | TD |  | 1710 | 1820 | 1700 | 1840 | 1850 | 1560 |
| DuPont impact strength |  | J |  | 1.2 | 1.1 | 1.2 | 1.0 | 1.0 | 1.5 |
| Folding endurance |  | MD | times | 1000< | 1000< | 1000< | 1000< | 1000< | 1000< |
|  |  | TD |  | 820 | 700 | 800 | 750 | 730 | 1000< |
| Tear strength |  | MD | N | 150 | 180 | 150 | 170 | 170 | 130 |
|  |  | TD |  | 140 | 150 | 140 | 150 | 150 | 115 |
| Surface resistance |  | Ω |  | 2.4E+04 | 2.6E+04 | 2.3E+04 | 2.9E+04 | 2.6E+04 | 2.7E+04 |
| Moldability |  |  |  | 5 | 5 | 5 | 5 | 5 | 5 |

TABLE 6

|  |  |  |  | Examples | |
| --- | --- | --- | --- | --- | --- |
|  |  |  |  | 13 | 14 |
| Tensile properties | Yield strength | MD | Mpa | 50 | 51 |
|  |  | TD |  | 47 | 49 |
|  | Breaking strength | MD | Mpa | 41 | 42 |
|  |  | TD |  | 39 | 40 |
|  | Elongation | MD | % | 40 | 37 |
|  |  | TD |  | 35 | 32 |
|  | Elasticity | MD | Mpa | 1950 | 1950 |
|  |  | TD |  | 1920 | 1910 |
| DuPont impact strength |  | J |  | 1.0 | 1.0 |
| Folding endurance |  | MD | times | 1000< | 1000< |
|  |  | TD |  | 500 | 480 |
| Tear strength |  | MD | N | 190 | 180 |
|  |  | TD |  | 150 | 150 |
| Surface resistance |  | Ω |  | 2.80E+04 | 2.60E+04 |
| Moldability |  |  |  | 5 | 5 |

Comparative Examples 1 to 8

As the raw material resins for the substrate layers, in addition to using resin compositions containing grafted rubbers having the compositions and properties of E to G shown in Table 1 and AS resins having the compositions of C and D shown in Table 2 in the proportions listed in Table 7, three-layered sheets were molded in the same manner as Examples 1 to 14, and samples were taken from each comparative example. The evaluation results are summarized in Tables 8 and 9.

TABLE 7

|  |  |  | Comparative Examples | | | | | |
| --- | --- | --- | --- | --- | --- | --- | --- | --- |
|  |  |  | 1 | 2 | 3 | 4 | 5 | 6 |
| Grafted rubber | E | mass % | 34 |  | 34 |  | 25 |  |
|  | F | mass % |  | 34 |  | 34 |  | 50 |
| AS copolymer | C | mass % | 66 |  |  | 66 | 75 |  |
|  | D | mass % |  | 66 | 66 |  |  | 50 |

|  |  |  | Comparative Examples | |
| --- | --- | --- | --- | --- |
|  |  |  | 7 | 8 |
| Grafted rubber | G | mass % | 34 | 25 |
| AS copolymer | C | mass % | 66 |  |
|  | D | mass % |  | 75 |

TABLE 8

| | | | | Comparative Examples | | | | | |
|---|---|---|---|---|---|---|---|---|---|
| | | | | 1 | 2 | 3 | 4 | 5 | 6 |
| Tensile properties | Yield strength | MD | Mpa | 45 | 37 | 48 | 36 | 50 | 34 |
| | | TD | | 42 | 36 | 47 | 35 | 49 | 33 |
| | Breaking strength | MD | Mpa | 36 | 29 | 42 | 28 | 42 | 27 |
| | | TD | | 35 | 29 | 41 | 27 | 41 | 26 |
| | Elongation | MD | % | 50 | 100 | 51 | 105 | 45 | 150 |
| | | TD | | 35 | 75 | 35 | 80 | 30 | 100 |
| | Elasticity | MD | Mpa | 1850 | 1550 | 1850 | 1540 | 1990 | 1420 |
| | | TD | | 1840 | 1540 | 1840 | 1530 | 1910 | 1410 |
| DuPont impact strength | | | J | 0.8 | 1.6 | 1.0 | 1.5 | 0.7 | 1.9 |
| Folding endurance | | MD | times | 300 | 1000< | 270 | 1000< | 70 | 1000< |
| | | TD | | 150 | 1000< | 100 | 1000< | 50 | 1000< |
| Tear strength | | MD | N | 190 | 140 | 170 | 130 | 190 | 120 |
| | | TD | | 180 | 135 | 165 | 125 | 180 | 100 |
| Surface resistance | | | Ω | 2.5E+04 | 2.8E+04 | 2.5E+04 | 2.6E+04 | 2.4E+04 | 2.1E+04 |
| Moldability | | | | 4 | 5 | 4 | 5 | 4 | 5 |

TABLE 9

| | | | | Comparative Examples | |
|---|---|---|---|---|---|
| | | | | 7 | 8 |
| Tensile properties | Yield strength | MD | Mpa | 32 | 37 |
| | | TD | | 31 | 36 |
| | Breaking strength | MD | Mpa | 25 | 29 |
| | | TD | | 24 | 29 |
| | Elongation | MD | % | 200 | 90 |
| | | TD | | 150 | 80 |
| | Elasticity | MD | Mpa | 1350 | 1500 |
| | | TD | | 1300 | 1480 |
| DuPont impact strengh | | | J | 2.0 | 1.6 |
| Folding endurance | | MD | times | 1000< | 1000< |
| | | TD | | 1000< | 1000< |
| Tear strength | | MD | N | 120 | 140 |
| | | TD | | 100 | 130 |
| Surface resistance | | | Ω | 2.3E+04 | 2.7E+04 |
| Moldability | | | | 5 | 5 |

Each of the above sheets of the examples and comparative examples was subjected to a punching test, the above punching burr index was evaluated, and the results are shown in Table 10.

TABLE 10

| | Examples | | | | | |
|---|---|---|---|---|---|---|
| | 1 | 2 | 3 | 4 | 5 | 6 |
| Punching burr index (clearance: 20 μm) | 5 | 5 | 5 | 5 | 5 | 4 |
| Punching burr index (clearance change: 2 μm) | 5 | 5 | 5 | 5 | 5 | 4 |
| Punching burr index (clearance change: 60 μm) | 4 | 4 | 4 | 4 | 4 | 4 |
| Punching burr index (punch speed change: 130 mm/sec) | 4 | 4 | 4 | 4 | 4 | 4 |

| | Examples | | | | | |
|---|---|---|---|---|---|---|
| | 7 | 8 | 9 | 10 | 11 | 12 |
| Punching burr index (clearance: 20 μm) | 5 | 5 | 5 | 5 | 5 | 4 |
| Punching burr index (clearance change: 2 μm) | 5 | 5 | 5 | 5 | 5 | 4 |
| Punching burr index (clearance change: 60 μm) | 4 | 4 | 4 | 4 | 4 | 4 |
| Punching burr index (punch speed change: 130 mm/sec) | 4 | 4 | 4 | 4 | 4 | 4 |

TABLE 10-continued

| | Examples | |
|---|---|---|
| | 13 | 14 |
| Punching burr index (clearance: 20 μm) | 5 | 5 |
| Punching burr index (clearance change: 2 μm) | 5 | 5 |
| Punching burr index (clearance change: 60 μm) | 5 | 4 |
| Punching burr index (punch speed change: 130 mm/sec) | 5 | 5 |

| | Comparative Examples | | | | | |
|---|---|---|---|---|---|---|
| | 1 | 2 | 3 | 4 | 5 | 6 |
| Punching burr index (clearance: 20 μm) | 2 | 1 | 2 | 2 | 4 | 2 |

| | Comparative Examples | |
|---|---|---|
| | 7 | 8 |
| Punching burr index (clearance: 20 μm) | 2 | 2 |

With respect to tensile properties, DuPont impact strength, folding endurance and tear strength etc., the sheets of the examples all had properties above a certain level as sheets for packaging various electronic parts, the moldability was good, and the punching burr indexes in the punching tests were also good.

In contrast, all the sheets of the comparative examples seemed to have an overall tendency for punching burrs to occur in the punching tests, and the punching burr indexes when punching at a clearance of 20 μm were mostly 3 or less. The sheet of comparative example 5 had a relatively good punching burr index under this condition, but the DuPont impact strength and folding strength of the sheet were very low.

The invention claimed is:

1. A surface conductive laminated sheet, comprising:
a substrate layer comprising an ABS resin as a main ingredient; and
a surface layer laminated on a surface of the substrate layer, wherein the ABS resin comprises:
a composition comprising 5 to 15 mass % of a vinyl cyanide monomer, 45% to 65 mass % of a diene rubber, 50 to 20 mass % of an aromatic vinyl monomer, and a grafted rubber having a graft ratio of 50% to 80%; and a copolymer comprising vinyl cyanide and an aromatic vinyl, the copolymer comprising a composition comprising 20 to 40 mass % of vinyl cyanide and 60 to 80 mass % of the aromatic vinyl, and has a mass average molecular weight (Mw) of 80,000 to 120,000, and wherein the grafted rubber comprises a graft chain having a mass average molecular weight (Mw) of 18,000 to 56,000 and a volume average particle diameter of 0.3 μm to 2.0 μm.

2. The surface conductive laminated sheet of claim 1, wherein the ABS resin is a resin comprising 15 to 50 mass % of the grafted rubber and 85 to 50 mass % of the copolymer comprising vinyl cyanide and an aromatic vinyl.

3. The surface conductive laminated sheet of claim 1, wherein the surface layer is formed from a thermoplastic resin composition having a surface resistance of $10^2$ to $10^{10}$ Ω.

4. The surface conductive laminated sheet of claim 1, wherein the grafted rubber has a graft ratio of 50% to 75%.

5. The surface conductive laminated sheet of claim 1, wherein the grafted rubber comprises 5 to 15 mass % of acrylonitrile, based on a total mass of the grafted rubber.

6. The surface conductive laminated sheet of claim 1, wherein the grafted rubber comprises 45 to 65 mass % of butadiene, based on a total mass of the grafted rubber.

7. The surface conductive laminated sheet of claim 1, wherein the grafted rubber comprises 50 to 20 mass % of styrene, based on a total mass of the grafted rubber.

8. The surface conductive laminated sheet of claim 1, wherein the grafted rubber comprises, based on a total mass of the grafted rubber:
5 to 15 mass % of acrylonitrile;
45 to 65 mass % of butadiene; and
50 to 20 mass % of styrene.

9. The surface conductive laminated sheet of claim 1, wherein the volume average particle diameter of the grafted rubber is from 1.0 to 2.0 μm.

10. The surface conductive laminated sheet of claim 1, wherein the surface layer is formed from a resin composition comprising a styrene resin and carbon black.

11. The surface conductive laminated sheet of claim 10, wherein the carbon black is furnace black, channel black, or acetylene black.

12. The surface conductive laminated sheet of claim 11, wherein a content of the carbon black in the surface layer is from 5 to 50 parts by mass, with respect to 100 parts by mass of the styrene resin.

13. A container, molded from the surface conductive laminated sheet of claim 1.

14. The container of claim 13, which is a carrier tape or a tray for transporting electronic parts.

* * * * *